United States Patent
Von Thienen et al.

(10) Patent No.: US 6,261,533 B1
(45) Date of Patent: Jul. 17, 2001

(54) PROCESS FOR PREPARING ALUMINUM OXIDE MASSES WITH VERY NARROW PORE RADIUS DISTRIBUTION

(75) Inventors: Norbert Von Thienen, Hamburg; Hansjörg Sinn, Norderstedt, both of (DE)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 09/632,684

(22) Filed: Aug. 7, 2000

Related U.S. Application Data

(62) Division of application No. 09/268,951, filed on Mar. 16, 1999, now Pat. No. 6,129,904, which is a continuation of application No. PCT/EP97/04934, filed on Sep. 9, 1997.

(30) Foreign Application Priority Data

Sep. 19, 1996 (DE) .............................................. 196 38 442

(51) Int. Cl.$^7$ ....................................................... C01F 7/30
(52) U.S. Cl. ............................................ 423/628; 423/630
(58) Field of Search ..................................... 423/625, 628, 423/630, 327.1

(56) References Cited

U.S. PATENT DOCUMENTS

| | | | |
|---|---|---|---|
| 3,954,958 | * | 5/1976 | Mastui et al. . |
| 5,002,750 | * | 3/1991 | Kadokura et al. . |
| 6,063,358 | * | 5/2000 | Lindquist et al. . |
| 6,069,108 | * | 5/2000 | Ernst et al. . |

OTHER PUBLICATIONS

Harlan, C. Jeff, et al. "tert–Butylaluminum Hydroxides and Oxides: Structural Relationship between Alkylalumoxanes and Alumina Gels," Organometallics, 13:2957–2969 (1994).*

* cited by examiner

Primary Examiner—Wayne Langel
Assistant Examiner—Christina Ildebrando
(74) Attorney, Agent, or Firm—Scott R. Cox

(57) ABSTRACT

A process for the production of an aluminum oxide composition which includes subjecting an aluminoxane with a basic structural element of —Al—O—Al— or a basic oligomeric structural element of —Al—O—Al—O—Al—O—Al— to mild hydrolysis with at least one inert gas moistened below its dew point to produce a composition and subjecting the composition to thermolysis at temperatures from about 300 to about 900° C.

13 Claims, 1 Drawing Sheet

US 6,261,533 B1

Figure 1:
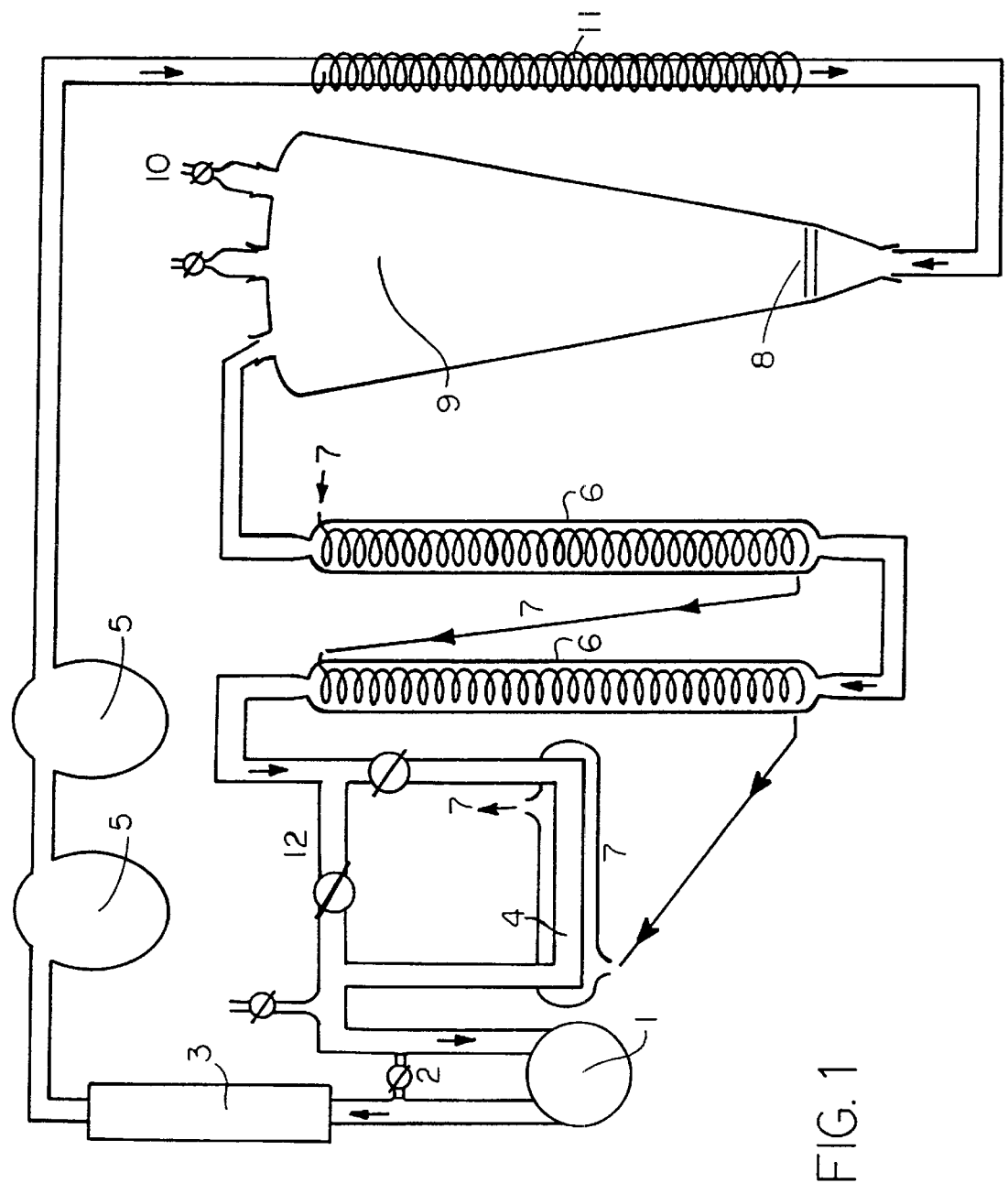

PROCESS FOR PREPARING ALUMINUM OXIDE MASSES WITH VERY NARROW PORE RADIUS DISTRIBUTION

This application is a divisional of Ser. No. 09/268,951, filed Mar. 16, 1999, now U.S. Pat. No. 6,129,904, which is a continuation of PCT/EP97/04934, filed Sep. 9, 1997.

BACKGROUND OF THE INVENTION

1. Field of the Invention

The invention concerns aluminum oxide masses with very narrow pore radius distribution which are particularly suited for production of catalysts and/or adsorption agents.

2. Description of Related Art

It is normally desirable that catalysts have a large surface. Since the surface can be increased only slowly and expensively by size reduction, an attempt is made to give a catalyst material a large "internal surface" by formation of very fine channels, so-called pores. The following relation applies to cylindrical pores:

Internal surface=2×pore volume/pore radius.

For pores having a radius of 4 nm and a pore volume of 1 $cm^3 g^{-1}$, an internal surface area of 1000 $m^2 g^{-1}$. is obtained. Such materials are already commercially available.

However, the size of the internal surface area is not the only thing that matters, but also that the walls of the catalyst pores have the correct appropriate structure. Wall structures of catalyst pores (acid, basic centers, openings, metal clusters, etc.) are considered the cause for active sites.

The pores of now common catalysts, except for the special case of zeolites, are not uniform in pore size and pore shape. Pores with more than 25 nm radius are referred to as macropores, pores with a radius from 1 to 25 nm are called mesopores. Pores with a radius smaller than 1 nm are the so-called micropores.

The macro- and mesopores are generally caused by the spacing between primary particles. The micropores are attributed to cracks with almost atomic dimensions within the primary particles. In the zeolites, which occur in nature, but can also be synthesized, cuboctahedral structures are present. Their structural elements are Si—O—Al structures. Their peculiarities consist of the fact that they surround relatively large cavities (cages) that are accessible via comparatively narrow openings. They have a very large internal surface area in the form of their pores with fixed symmetry.

BRIEF SUMMARY OF THE INVENTION

The underlying object of the invention is to prepare aluminum oxide masses or high specific surface area and a narrow pore radius distribution.

DETAILED DESCRIPTION OF THE INVENTION

The subject of the invention are therefore aluminum oxide masses characterized by a specific surface area of $\geq 70$ $m^2/g$ and a narrow pore radius distribution of $\geq 90\%$ between about 1.7 and 2.2 nm.

The specific surface is preferably $\geq 100$ $m^2/g$, the pore radius distribution with equal to or greater than 95% is between about 1.8 and 2.1 nm.

These masses can also contain limited fractions of aluminum oxocarbide structures related to production. They can also be doped with —Si—O— structures and/or catalytically active substances, especially with catalytically active metals.

The masses can be present in piece form so that they can be used for a fluidized bed process, optionally after further size reduction. Moreover, the masses can be bonded to at least one zeolite.

The aluminum-containing masses according to the invention can be produced by initially subjecting an aluminoxane with a basic structural element —Al—O—Al— and/or an oligomeric structure based on Al—O—Al—O—Al—O—Al, in which the free bonds are occupied by organic residues, preferably alkyl residues, to mild hydrolysis and to thermolysis at temperatures of about 300 to 900° C.

Hydrolysis is preferably run in a fluidized bed, especially at temperatures of about 10 to 100° C.

One preferably starts from an aluminoxane in which the free bonds are occupied by lower alkyl groups, especially methyl groups.

One can also start from an aluminoxane that was produced in higher hydrocarbons, like toluene or in polar compounds, like dioxane or diethyl ether.

One can also start from aluminoxanes that were doped with siloxanes (silanols) and/or catalytically active substances, like metals.

When it is desirable to incorporate Si—O groups, the aluminoxanes are converted in known fashion with silanol before treatment according to the invention. If dopants, especially heavy metals, are desired, heavy metal compounds like acetylacetonates, can be added to the solutions or suspensions of aluminoxanes, during which these heavy metals are reduced and precipitate in a very fine distribution in the aluminoxane.

To produce zeolite-containing masses reaction of aluminoxanes, optionally together with the dopants, can be carried out in the presence of at least one zeolite and the reaction product which may be obtained in piece form, can be optionally subjected to size reduction.

Powdered zeolites can be stirred into the solution of aluminoxane. After treatment of the aluminoxane according to the invention the obtained masses contain the zeolites with unaltered activity. Since the mass produced according to the invention is in coarse pieces, this is of particular interest when very fine-grain zeolites are to be used in fluidized beds, which require a specific particle size, since the coarse-piece material can be reduced as desired.

The aggregates have a bimodal pore structure, which is caused, on the one hhand, by the pores structure of the aluminum oxide masses and, on the other hand, by the pore structure of the zeolite. It was possible in this fashion to influence the selectivity of catalysts or adsorption agents produced from the masses.

The object of the invention is also the use of the aforementioned masses to produce catalysts and/or adsorption agents.

The aluminoxanes used according to the invention were investigated in the course of research work on Ziegler-Natta catalysts. The basic structural element is an Al—O—Al structure. Oligomeric Al—O—Al—O—Al—O—Al structural elements are also present to a significant extent, in which the free bonds of Al in the aluminoxane are occupied by organic groups, especially alkyl groups. In special cases, especially in methylaluminoxane, cuboctahedral structures are also formed with a composition $[Al_{16}O_{12}(CH_3)_{24}]$ H $2Al(CH_3)_3$, which can be understood based on coordinative saturation of a base unit. For this purpose the literature source "Macromolecular Symposia Aluminoxanes", Macromol. Symp., Vol. 97; especially A. R. Barron, pages 15–25; H. Sinn, pages 27–52 is referred to.

It was initially investigated whether large internal surface areas can be formed during elimination of the alkyl groups by hydrolysis or thermolysis. During hydrolysis with large amounts of water vapor or liquid water, however, the —Al—O—Al—O—Al— structures were destroyed upon formation of aluminum hydroxide, whereby aluminum oxides with a larger surface area but with a very broad pore radius distribution were obtained. Mild hydrolysis with limited amounts of water vapor led to products of a low surface area and a broad pore radius distribution. If thermolysis was used instead of hydrolysis, then aluminum oxocarbides were obtained with a limited specific surface area and a broad pore radius distribution.

Only with the combination according to the invention of mild hydrolysis and thermolysis could masses with the stated high internal specific surface and narrow pore radius distribution be obtained. Mild hydrolysis is preferably run in a fluidized bed, in which the aluminoxane is preferably fluidized with nitrogen or argon, in which very small amounts of gaseous water are added to the inert gas with the stipulation that the dew point limit is always fallen short of. This will be achieved, for example, if the fluidizing gas absorbed water vapor over cooled ice at low temperature (water vapor partial pressure about 0.5 to 5 mbar) and then was brought to higher temperature before contact with the fluidized product during hydrolysis (about 0 to 100° C., preferably about 20° C. above the saturation temperature).

The pore radius distribution of the obtained products primarily (>95%) lies between about 1.8 and 2.1 nm. The obtained aluminum oxide masses therefore have pore radii that are much higher than those of zeolites, which generally lie between 0.3 and 1 nm.

The surface area determinations were carried out according to BET on a Sorptomatic 1900 from Carlo Erba. Evaluation was carried out according to BET in the Mileston 100 program. Nitrogen at −195.82° C. and a working pressure of 800 torr served as measurement gas. Adsorption occurred up to about 780 torr, desorption was recorded by the final pressure of adsorption up to about 30 torr. The pore radius distribution could also be interpreted from the obtained curves.

The invention is illustrated by the following examples in which examples 1 to 6 illustrate preparation of the aluminoxane and examples 7 and 8 illustrate the preparation of the aluminum oxide masses according to the invention by hydrolysis and thermolysis.

EXAMPLE 1

Preparation of Methylaluminoxane from Toluene

Commercial methylaluminoxane was used. In the present case aluminoxane prepared by passing a solution of trimethylaluminum in toluene at −40° C. over an ice surface cooled to 40° C. (cf., Sinn, Bliemeister, Tikwe, Clausnitzer, Winter and Zarnke, "Some new results on methylalumoxanes" in W. Kaminsky, H. Sinn (editors), "Olefin polymerization", Springer-Verlag, 1988, pp. 257 ff). The solvent was distilled off in vacuum, the residues condensed at $10^{-4}$ mbar. The glassy or powdered materials after crushing were subjected according to example 7 to hydrolysis and according to example 8 to pyrolysis or hydrolysis with subsequent pyrolysis.

EXAMPLE 2

Preparation of Methylaluminoxane from Dioxane

Water in small batches was added to a solution of trimethylaluminoxane (TMA) in dioxane during cooling at room temperature; the next addition occurred after gas liberation ceased; addition was continued until 1 mol of methane was evolved per mol of TMA. The solvent was distilled off in vacuum, the residues condensed at $10^{-4}$ mbar. The glassy or powdered material after crushing was subjected according to example 7 to hydrolysis and according to example 8 to pyrolysis or to hydrolysis with subsequent pyrolysis.

EXAMPLE 3

Preparation of Aluminoxane from TMA Diethyl Etherate in Toluene

Similar to example 1 a solution of TMA diethyl etherate in toluene was reacted at −30° C. on an ice surface. After discharge of the solution from the reactor, Al—OH groups were trapped by dropwise addition of an excess of TMA during cooling at −20 to −10° C. The solvent as well as excess TMA metals were then removed in vacuum. The oily products were converted to a glassy solid by several weeks of drying in high vacuum ($10^{-6}$ mbar). This solid was the starting material for treatment according to the invention.

EXAMPLE 4

Doping of Methylaluminoxane with Triethylsilanol

Triethylsilanol was added to a solution of methylaluminoxane with a methyl/aluminum ratio of 1.65 under ice cooling. All the silanol was consumed until an Al/Si ratio was reached and therefore a maximum of $\frac{2}{3}$ of the methyl groups of the aluminoxane was substituted with Si—O groups. Depending on the added amount of silanol, the product was more or less rich in methyl groups, which can be subjected to hydrolysis.

EXAMPLE 5

Doping of Methylaluminoxane with Heavy Metal Compounds

A solution of 3.5 iron(III) acetylacetonate was added dropwise at −78° C. to a solution of 25 g methylaluminoxane. After 24 hours of standing at room temperature it was filtered. After vacuum drying a product with an aluminum/iron ratio of about 7 and a methyl/aluminum ratio of 1.50 it was obtained from the filter residue. After distillation of the solvent in vacuum and subsequent vacuum drying the filtrate yielded a product with an aluminum/iron ratio of about 1.60 and a methyl/aluminum ratio of 1.55. Materials of this type served as educts for further treatment according to examples 7 and 8.

EXAMPLE 6

Conversion of Methylaluminoxane from Toluene with Zeolite

The methylaluminoxane was dissolved from preparation in twice the amount of toluene. The zeolite H-ZSM-5 dried beforehand at 250° C. in vacuum was then added in the desired amount (for example in an aluminoxane:zeolite ratio of 1:2), during which methane was developed. The mixture was then allowed to stand overnight with agitation. After subsequent careful distillation of the solvent in vacuum a gray solid was obtained that was fed to further reaction.

EXAMPLE 7

Mild Hydrolysis of Aluminoxanes (Comparison)

Hydrolysis was carried out in the apparatus sketched in the accompanying figure. Gas circulation occured by means of a diaphragm pump 1. The gas velocity is controlled by bypass 2, and which is measured by means of a rotameter 3. The gas is moistened in the water (ice) supply 4. Pressure surge equalization vessel 5 serves to smooth the gas flow. Cooler 6 serves for gas tempering. The cooling loop is designated 7. Fluidization of the aluminoxane occured in a fluidized bed reactor 9 equipped with a frit 8 as gas distributor, which was provided with a discharge 10 to a gas meter. The gas was heated with a heating coil 11. The incipient fluidization point was set by means of a bypass 12. The aluminoxane was initially fluidized in reactor 9 with absolutely dry argon. After adjustment of a reasonable fluidization state (about double gas velocity after the beginning of fluidization (incipient fluidization point)) the bypass 12 was closed and the fluidizing gas was loaded by passing over the cooled (−20° C.) ice surface 4 corresponding to the very low water vapor pressure (about 0.5 mbar) over ice and fed back to the fluidized bed after heating to 10° C. Fluidization was continued until methane evolution (volume of pressure increase) no longer occurs.

EXAMPLE 8

Pyrolysis of Aluminoxane (Comparison) or Hydrolysis Products (According to the Invention)

The educt being pyrolyzed is tansferred under argon as protective gas into a quartz tube and heated within 1.5 hours to 400° C. and within another 2 hours to 850° C. Any liquid condensates formed were trapped in a downline dead end tube cooled to room temperature and the pyrolysis gases taken off. The final temperature was maintained for about 24 hours and the tubes were then allowed to cool at room temperature.

The results are shown in the following table.

TABLE

| | Surface area (m²/g) | Pore radius (nm, [%]) |
|---|---|---|
| Aluminoxane according to example 1: | | |
| Pyrolysis 400° C. | 10 | <2 [50], 2–6 [30], 6–15 [15] |
| Pyrolysis 850° C. | 7 | <3 [80], 3–6 [18] |
| Hydrolysis | 10 | <2.5 [80], 2, 5–10 [17] |
| Hydrolysis + pyrolysis 400° C. | 200 | 0.5–2.5 [95] |
| Hydrolysis + pyrolysis 850° C. | 70 | 1.7–2.2 [>95] |
| Aluminoxane according to example 2: | | |
| Pyrolysis 400° C. | 85 | <0.5 [25], 0.5–2.5 [67] |
| Pyrolysis 850° C. | 9.7 | 0.5–4.0 [80] |
| Hydrolysis | 9.6 | 0.5–5 [85] |
| Hydrolysis + pyrolysis 400° C. | 184 | 1.9–2.1 [>99] |
| Aluminoxane according to example 3: | | |
| Pyrolysis 400° C. | 12 | 0.5–3 [50], 3–12 [40] |
| Pyrolysis 850° C. | 59 | 0.5–3 [55], 3–12 [38] |
| Hydrolysis | 10 | <3.0 [60], 3–6 [36] |

TABLE-continued

| | Surface area (m²/g) | Pore radius (nm, [%]) |
|---|---|---|
| Hydrolysis + pyrolysis 400° C. | 250 | 1.9–2.1 [>95] |
| Hydrolysis + pyrolysis 850° C. | 120 | 2.0–2.2 [>95] |

The table shows that not only a very high specific surface area is produced by hydrolysis and thermolysis, but the pore radius distribution is also kept within narrow limits. The table also shows that the process is not limited to methylalumninoxane produced in toluene, but aluminoxanes produced in the presence of diethyl ether or dioxane can also acquire a large internal surface and unusually narrow pore radius distribution.

What is claimed is:

1. A process for the production of an aluminum oxide composition having a specific surface area equal to or greater than about 70 m²/g and a narrow pore radii distribution where at least about 90 percent of the pore radii are between about 1.7 and 2.2 nm, said process comprising subjecting an aluminoxane with a basic structural element of —Al—O—Al— or a basic oligomeric structural element of —Al—O—Al—O—Al—O—Al— to mild hydrolysis with at least one inert gas moistened below its dew point to produce an intermediate composition and subjecting the intermediate composition to thermolysis at temperatures from about 300 to about 900° C. to form said aluminum oxide composition.

2. The process of claim 1 wherein organic groups are bonded to the basic structural element.

3. The process of claim 2 wherein the organic groups are alkyl groups.

4. The process of claim 3 wherein the alkyl groups are methyl groups.

5. The process of claim 1 wherein the hydrolysis is conducted in a fluidized bed.

6. The process of claim 1 wherein the hydrolysis is conducted at a temperature of about 0 to about 100° C.

7. The process of claim 1 wherein the aluminoxane is dissolved in higher hydrocarbons or in a polar compound prior to hydrolysis.

8. The process of claim 7 wherein the higher hydrocarbons comprise toluene.

9. The process of claim 7 wherein the polar compound is selected from the group consisting of dioxane and diethyl ether.

10. The process of claim 1 wherein the aluminoxane is doped with siloxane.

11. The process of claim 1 wherein the aluminoxane is doped with a catalytically active substance.

12. The process of claim 1 further comprising reacting the aluminoxane with a dopant in the presence of at least one zeolite.

13. The process of claim 1 further comprising reducing the size of the formed aluminum oxide composition.

\* \* \* \* \*